(12) United States Patent
Hu et al.

(10) Patent No.: US 7,844,086 B2
(45) Date of Patent: Nov. 30, 2010

(54) HEAD POSE ASSESSMENT METHODS AND SYSTEMS

(75) Inventors: Yuxiao Hu, Beijing (CN); Lei Zhang, Beijing (CN); Mingjing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 308 days.

(21) Appl. No.: 12/143,717

(22) Filed: Jun. 20, 2008

(65) Prior Publication Data

US 2008/0298637 A1 Dec. 4, 2008

Related U.S. Application Data

(62) Division of application No. 10/452,783, filed on May 30, 2003, now Pat. No. 7,391,888.

(51) Int. Cl.
*G06K 9/00* (2006.01)

(52) U.S. Cl. .................... 382/118; 348/169; 345/619

(58) Field of Classification Search ............... 382/103, 382/106, 107, 117, 118, 119, 181, 189, 190, 382/195, 201, 209, 222, 5; 348/169; 345/619, 345/156–158, 175, 177, 181, 204, 207
See application file for complete search history.

(56) References Cited

U.S. PATENT DOCUMENTS

| | | | |
|---|---|---|---|
| 6,009,210 A | | 12/1999 | Kang |
| 6,061,064 A | * | 5/2000 | Reichlen .................... 345/418 |
| 6,215,471 B1 | | 4/2001 | DeLuca |
| 6,272,231 B1 | | 8/2001 | Maurer et al. |
| 6,323,884 B1 | | 11/2001 | Bird et al. |
| 6,791,531 B1 | * | 9/2004 | Johnston et al. ............. 345/157 |
| 6,931,596 B2 | | 8/2005 | Gutta et al. |
| 2002/0039111 A1 | | 4/2002 | Gips et al. |

(Continued)

FOREIGN PATENT DOCUMENTS

JP 1091325(A) 4/1989

(Continued)

OTHER PUBLICATIONS

Hager, et al., "Real-Time Tracking of Image Regions with Changes in Geometry and Illumination", IEEE, 1996, pp. 403-410.

(Continued)

*Primary Examiner*—Anand Bhatnagar
(74) *Attorney, Agent, or Firm*—Lee & Hayes, PLLC (57) ABSTRACT

Improvements are provided to effectively assess a user's face and head pose such that a computer or like device can track the user's attention towards a display device(s). Then the region of the display or graphical user interface that the user is turned towards can be automatically selected without requiring the user to provide further inputs. A frontal face detector is applied to detect the user's frontal face and then key facial points such as left/right eye center, left/right mouth corner, nose tip, etc., are detected by component detectors. The system then tracks the user's head by an image tracker and determines yaw, tilt and roll angle and other pose information of the user's head through a coarse to fine process according to key facial points and/or confidence outputs by pose estimator.

20 Claims, 5 Drawing Sheets

U.S. PATENT DOCUMENTS

| | | |
|---|---|---|
| 2002/0126090 A1* | 9/2002 | Kirkpatrick et al. ......... 345/158 |
| 2004/0096096 A1 | 5/2004 | Huber |
| 2005/0163376 A1 | 7/2005 | Kaneda |

FOREIGN PATENT DOCUMENTS

| | | |
|---|---|---|
| JP | 4205617(A) | 7/1992 |
| JP | 7141098(A) | 6/1995 |
| JP | 11175246(A) | 7/1999 |
| JP | 2003503773(T) | 1/2003 |

OTHER PUBLICATIONS

Huang et al., "Uniqueness of 3D Pose Under Weak Perspective: A Geometrical Proof", University of Illinois at Urbana-Champaign, Dec. 1995, pp. 1-7.

* cited by examiner

HEAD POSE ASSESSMENT METHODS AND SYSTEMS

CROSS REFERENCE TO RELATED APPLICATIONS

This patent application is a divisional application of co-pending, commonly-owned U.S. patent application Ser. No. 10/452,783 entitled "Head Pose Assessment Methods and Systems" filed on May 30, 2003, which application is incorporated herein by reference.

TECHNICAL FIELD

This invention relates to computers and software, and more particularly to methods and systems for assessing the position of a user's head and affecting applicable computer operations based on such assessments.

BACKGROUND OF THE INVENTION

Computers and other like devices are invaluable tools in nearly every industry and setting. These devices and appliances come in a variety of different forms and may be designed as general purpose or special purpose tools. Common to most of these devices is the need to interface the user(s). A typical general purpose computer may include, for example, a display mechanism and at least one input mechanism. The display mechanism, e.g., a CRT-based monitor, flat-panel display, etc., is used to communicate information to the user visually. This communication is often accomplished, for example, using a graphical user interface (GUI) software program or the like. Typically, a user interfaces with the one or more computer program(s) associated with the GUI by providing user input to the computer that in some manner is recognized by the program(s) and/or GUI and causes certain changes in the computer operation/data. For example, a user may physically move a pointing device, such as a mouse, that is configured to send a signal to the computer logic such that within the GUI a graphical pointer is moved accordingly. With such a user input device, the user may then select certain program/GUI features by moving the graphical pointer to a specific region within the GUI as displayed and inputting a selection signal to the computer hardware, for example, by activating a button or the like provided on mouse. Such operations are common and well understood.

With the continued increase in computing power, many operating systems, programs, GUIs, etc. are able to support/perform multiple tasks. This is particularly useful for computers that have sufficiently large enough display devices to present multiple different program GUIs. For example, a user may configure the computer to simultaneously display the GUI for a word-processing application and a spreadsheet application within one or more display devices. When there are multiple tasks displayed, there is also a need to identify to the computer logic which of the GUIs and hence programs/applications that the user is currently interacting with. Thus, in the above example, to switch the focus of the computer logic to one of the applications, the user will typically "click-on" or otherwise select one of the GUI regions. This will cause the computer logic (e.g., operating system) to recognize that subsequent user inputs will be associated with the selected program. Hence, when the user in the example above wants to switch from the word-processing application to the spreadsheet application the user may point the graphical pointer to a portion of the GUI associated with the spreadsheet application and hit a mouse button.

In other exemplary arrangements, the user may switch the focus between different potential selectable regions within the GUI by entering one or more keyboard strokes. Such keyboard techniques may become less efficient when there are a greater number of selectable regions within the GUI and the user is required to repeat the input sequence several times until the desired selectable region is actively in focus.

While techniques that use a mouse or other like user pointing device may prove easier for users selecting between several selectable regions, they can become burdensome when the display device(s) present a large GUI interface. In such arrangements the user may be required to move the mouse over a great distance and may be required to pick up the mouse and place it back down again at a different position on the desktop/surface that it has moved across to complete a desired graphical pointer movement within the GUI. A similar action may be required by a touchpad pointing device. By way of further example, the user may be required to spin a trackball or other like pointing device for an extended period of time to move an on-screen cursor to the desired selectable region.

These various techniques and others like them, therefore, in certain circumstances tend to hinder or otherwise reduce the effectiveness of a multi-tasking user interface environment. Consequently, there is a need for new and/or improved methods, apparatuses and systems for providing user input to a computer or other like device.

SUMMARY OF THE INVENTION

Methods, apparatuses and systems are provided to effectively assess the users face and head pose such that the computer or like device can track the user's attention area based on an estimated head pose. Then the region of the display or graphical user interface that the user is looking towards can be automatically selected without requiring the user to provide any further inputs.

For example, in certain implementations a frontal face detector is applied to detect the user's frontal face and then key facial points such as left/right eye center, left/right mouth corner, nose tip, etc., are detected by component detectors. The system then tracks the user's head by an estimator such as an iterated SSD (sum of squares difference) tracker in temporally subsequent frames/images. The final yaw and tilt angle results, for example, are then provided to a mouse interface or the like for selecting the appropriate application/document. Threshold values and programmable delays may also be established to better control the selection of the various applications/documents that are opened.

By way of further example, the above stated needs and others are met by a method for use with a computing device. The method includes determining a first head pose for a user of the computing device at a first time and at least a second head pose for the user at a second time that is subsequent to the first time. For example, different video frames may be used. The method then includes automatically operatively switching between at least two selectable regions of at least one display device of the computing device based on at least one difference between the first head pose and at least the second head pose. In this manner, for example, when a user turns (rotates and/or tilts) his/her head to view a different selectable region of the computer display the computing device will recognize this and switch the user input focus, etc., to the region being viewed.

In certain implementations, determining the first head pose further includes, at the first time, generating a first image showing at least a first portion of a face of the user, detecting at least the first portion of the face within the first image, and detecting at least two different points within the detected first portion of the face and storing first tracking information associated with each of the different points. Similarly, determining the second head pose further includes, at the second time, generating a second image showing at least a second portion of the face of the user, detecting at least the second portion of the face within the second image, and detecting at least the same two different points within the detected second portion of the face and storing second tracking information associated with each of the different points.

In certain further exemplary implementations the method also includes comparing at least the first tracking information and the second tracking information to determine if an assessed display device view associated with the user has changed between the first time to the second time. If the assessed display device view associated with the user has changed between the first time and the second time, then the method includes selectively operatively switching a user input interface focus presented on the display device to a selectable region associated with the assessed display device view.

The method may also include classifying each of a plurality of portions of image data associated with the first image based on at least one classifying parameter to determine at least one facial region associated with the first portion of the face and image patch tracking the facial region associated with the first portion of the face in a corresponding portion of the second image to identify at least one detected face area. For example, the image patch tracking may employ a sum-of-square difference (SSD) image patch tracker to identify the detected face area. The image patch tracking may also compare at least a portion of the resulting detected face area with at least one alert threshold parameter to determine if associated system initialization process is required.

In certain implementations, the method further includes detecting at least one key facial component within the detected face area and determining a fine head pose of the user based on the detected key facial components.

The method may include determining a coarse head pose of the user based on confidence information associated with detecting the different key facial components within the detected face area and determining a fine head pose of the user based on the detected key facial components and the confidence information. Here, for example, the coarse head pose can be associated with a yaw angle and/or a tilt angle of the user's head.

In certain implementations, determining the fine head pose further includes using at least one estimator technique such as, for example, an ellipse estimator technique and/or an iterated estimator technique.

BRIEF DESCRIPTION OF THE DRAWINGS

A more complete understanding of the various methods and apparatuses of the present invention may be had by reference to the following detailed description when taken in conjunction with the accompanying drawings wherein:

FIGS. 3(a-d) are illustrative diagrams depicting certain exemplary facial features of a three-dimensional user head and how the geometry between these facial features appears different to an observer and within a two-dimensional image of the face, in accordance with certain aspects of the present invention.

DETAILED DESCRIPTION

Exemplary Computing Environment

Figure 1:
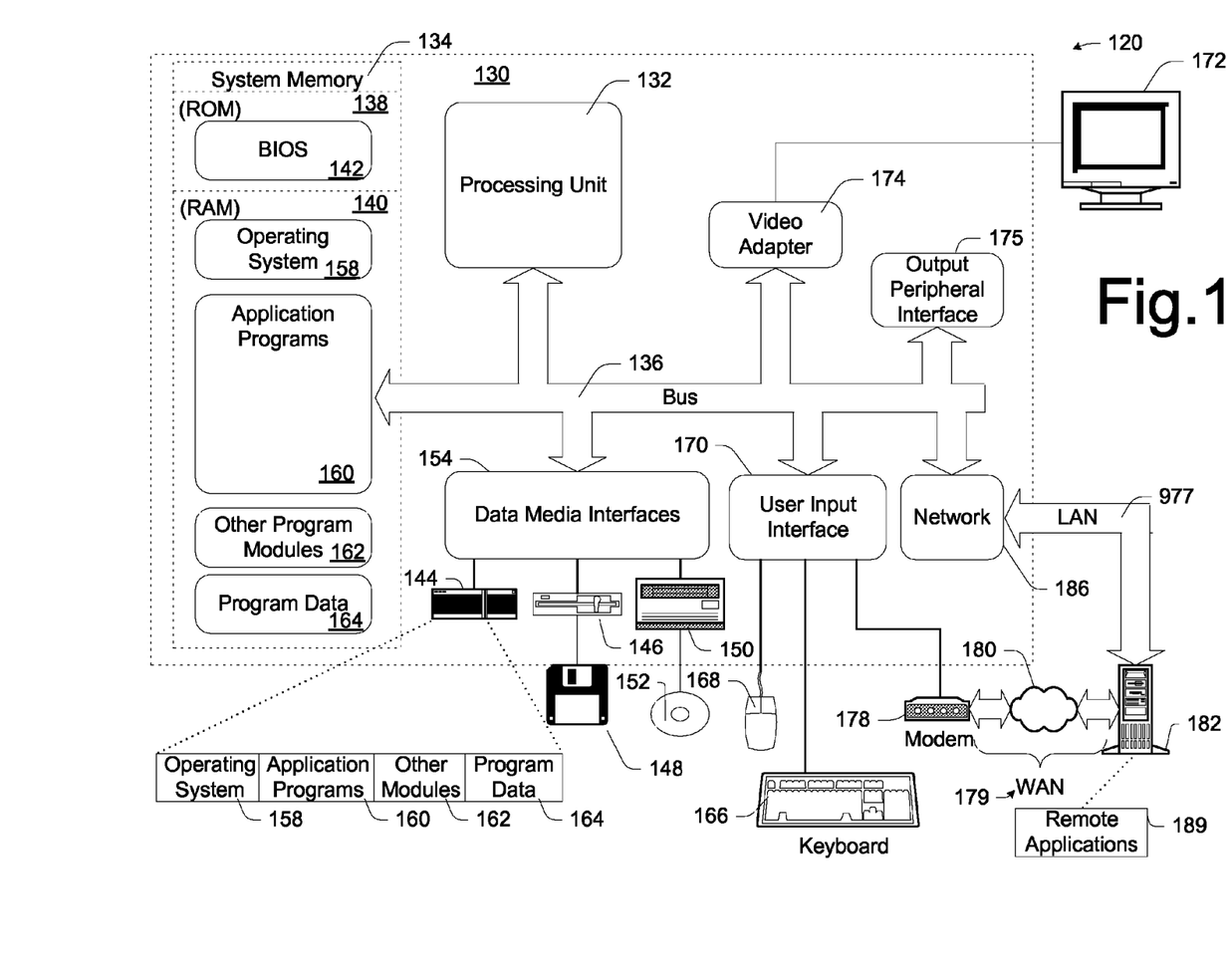
FIG. 1 is a block diagram depicting an exemplary computer system.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Pose Assessment Logic

The term "logic" as used herein is meant to represent one or more forms of logic and/or other types of circuitry that may be configured to perform certain functions associated with the various exemplary methods, apparatuses and systems described and/or shown herein. Such logic may include hardware, firmware, software and/or any combination thereof. The logic may also take of form of computer implementable instructions stored, transmitted or otherwise provided through at least one form of computer readable media.

Figure 2:
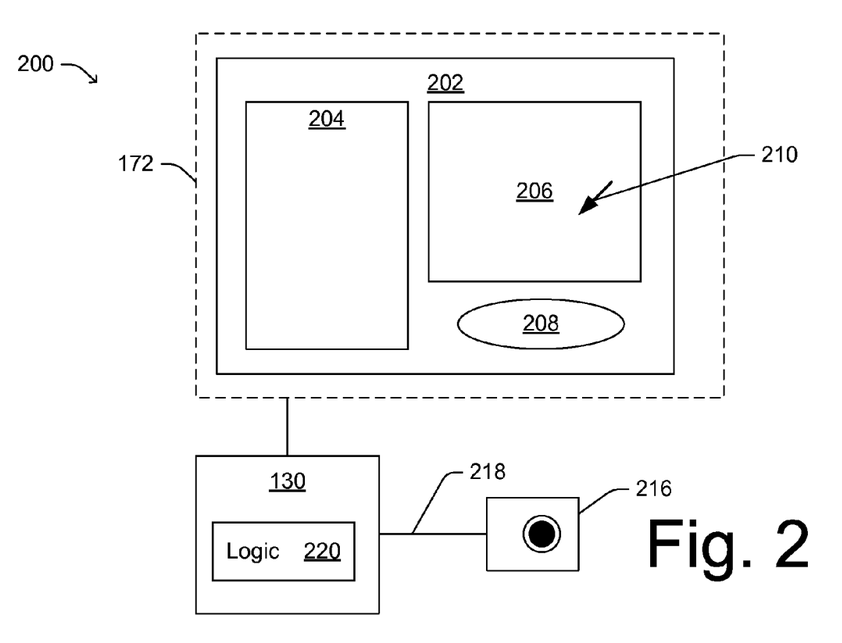
FIG. 2 is a block diagram depicting a system for use in assessing the pose of a person's head, in accordance with certain exemplary implementations of the present invention.

With this in mind, attention is drawn to FIG. 2, which is a block diagram depicting a system 200 for use in assessing the pose of a person's (e.g., user's) head, in accordance with certain exemplary implementations of the present invention. System 200 includes computer 130 and display device 172. Also included are at least one camera 216 and an applicable operative interface to computer 130 as represented by line 218. Camera 216 and interface 218 are configured to provide image data to logic 220 at least partially configured within computer 130. Camera 216 may be a still image camera configured to capture individual images at specific times and/or or a video camera that captures a sequence of video frames/images. Camera 216 may be color or monochrome. The resulting image data or at least a portion thereof is eventually available to logic 220 in some digital format. Those skilled in the art will recognize that various arrangements can be provided within camera 216, interface 218, computer 130, and/or logic 220 to properly transfer, process, convert, and store the image data as needed.

Within display device 172, which represents one or more display devices, there is a display area 202 having a plurality of exemplary selectable regions 204, 206 and 208. These selectable regions represent GUI or the like that is displayed for different applications, documents, drawings, features, controls, boxes, etc. Also depicted within display area 202 is a user input controlled cursor or pointer 210. Here, for example, pointer 210 is within selectable region 206.

With system 200, logic 220 is configured to detect the user's face based on the image data from camera 216 and determine where within display area 202 the user's face is directed and thereby estimate which one of the selectable regions that the user was probably looking at when the image was captured by camera 216. Logic 220 is configured in this example to process the image data sufficiently fast enough that for all practical purposes the resulting estimated head pose is near real-time. In this manner, logic 220 is essentially able to tack the user's head position and determine when the user is looking at a specific selectable region. Logic 220 can then cause other logic within computer 130, for example, user interface logic, to select that particular selectable region such that subsequent user inputs/commands are operatively associated with the correct underlying program or application.

Thus, for example, with logic 220 based on the estimated user's head pose, the selectable region nearest to the user's likely attention area is automatically activated such that pointer 210 and focus returns to the original/previous position when that portion of the GUI last lost focus. That is, when the user turns his/her head to look at a word-processing document, for example, the word-processing document is selected/activated automatically and the pointer/focus resumes at the last editing point. As this happens automatically, the user is not required to provide any other input to computer 130 to cause this switching action.

In certain implementations, logic 220 is also configured to wait for a certain amount of time before making such a switch in focus between various selectable regions. A programmable delay, for example, may be introduced to help account for the user moving his/her head rapidly or in some other manner that does not warrant switching focus.

In certain implementations, logic 220 is also configured to test the amount of estimated head motion or movement against one or more parameters or threshold values/levels, such that minor user head movements and/or processing errors do not cause inadvertent/unwarranted focus switching.

Those skilled in the art will also recognize from FIG. 2 that system 200 may be configured to use image data from a plurality of lenses/cameras to provide improved face detection and/or tracking.

Attention is now drawn to FIGS. 3(a-d) which illustratively depict certain exemplary facial features of a three-dimensional user's head and how the geometry between these exemplary facial features appears different to an observer (camera view) and within a two-dimensional image of the face there from, in accordance with certain aspects of the present invention.

Figure 3A:
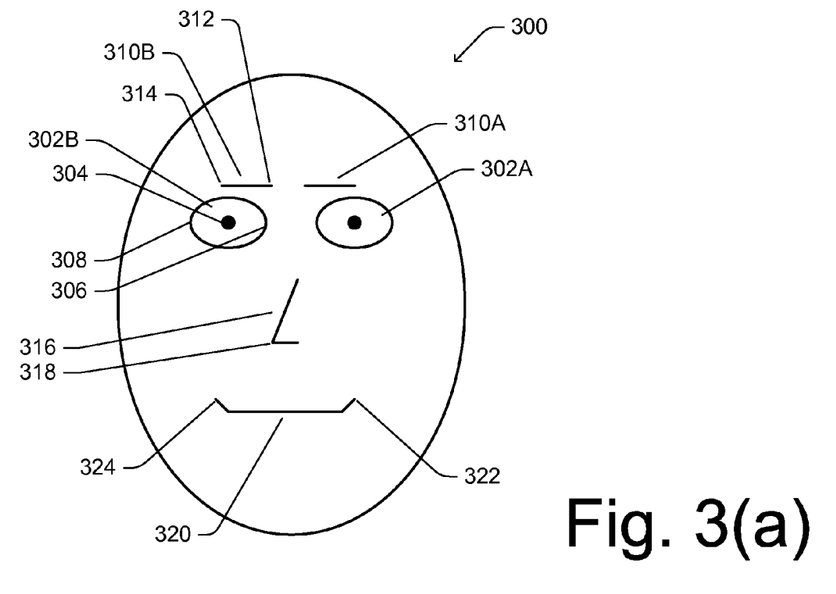

FIG. 3(a) shows a face portion 300 of a user's head. Face portion 300 includes two eyes, namely a left eye 302A and a right eye 302B. Here, for example, right eye 304B is illustrated as having a center 304, a left corner 306 and a right corner 308. There are also two eye brows, namely a left eye brow 310A and a right eye brow 310B. Here, for example, right eye brow 310B is illustrated has having a left corner 312 and a right corner 314. Face portion 300 also includes a nose 316 having a tip 318 and a mouth 320 having a left corner 322 and a right corner 324.

Based on at least a portion of these exemplary facial features and points, logic 220 is configured to identify the user's face within the image and to estimate the user's head pose based on movements detected in two or more temporally related images. The estimate may also consider information within the current frame.

Figure 3B:
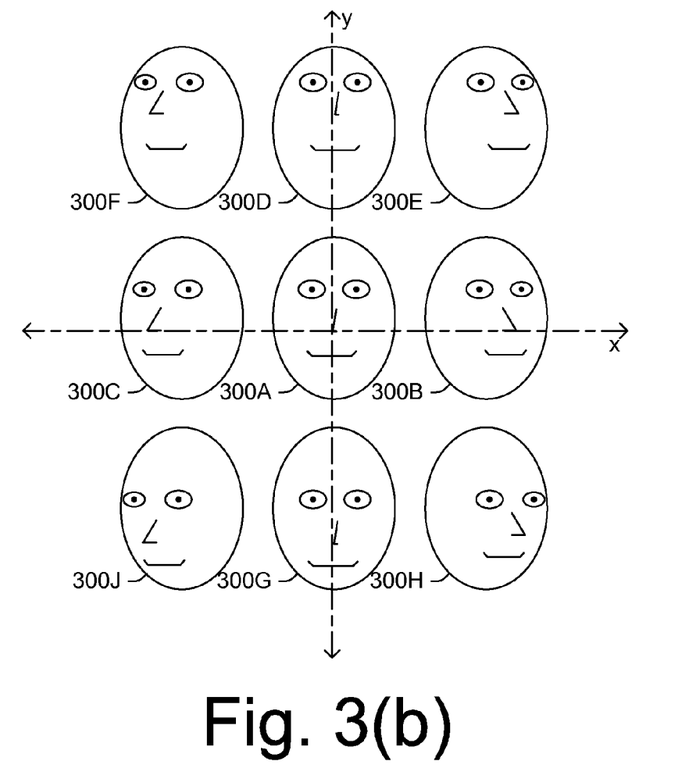

FIG. 3(b) shows several different head poses 300A-H, and 300J that may appear within a series of images. It is assumed here that in head pose 300A the user is basically looking directly at the viewer/camera and for reference in this description this initial position is centered on an x, y plane. If the user turns his/her head to his/her left (e.g., a positive x-axis direction), then the resulting image is head pose 300B. Conversely if the user turned his/her head to their right (e.g., a negative x-axis direction), then the resulting head pose would be 300C. Note that in head poses 300A, B and C, the user's head motion has only included head rotation along the y-axis.

In head poses 300D, E and F, the user's head is facing forward (D) and rotated left and right (E and F, respectively) while also being tilted in an upwards direction (e.g., in a positive y-axis direction). Similarly, head poses 300 G, H and J, demonstrate the user's head being forward, rotated left, and rotated right, respectively, while also being tilted downwards (e.g., in a negative y-axis direction).

From these simplified exemplary head poses 300A-H and J, one will notice that the projected geometry between certain detectable facial features changes depending on the rotation and/or tilt of the user's head. Thus, for example, logic 220 can be configured to identify two or more of these facial features and monitor changes in position of these facial features with respect to one another.

Figure 3C:
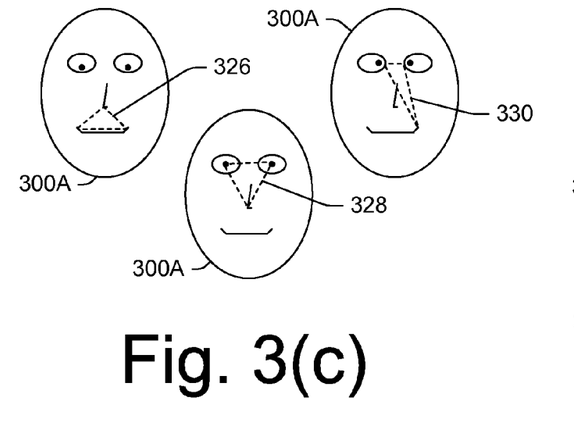

By way of example, in FIG. 3(c) shows how different facial features or points can be combined to establish a geometric pattern that will change as the user's head moves in rotation and/or tilting as illustrated in FIG. 3(b). In the first head pose 300A in FIG. 3(c) an exemplary triangle 326 is formed between the tip of the user's nose and the left and right corners of the user's mouth. In the second head pose 300A in FIG. 3(c) an exemplary triangle 328 is formed between the tip of the user's nose and the center of the user's left and right eyes. In the third head pose 300A in FIG. 3(c) an exemplary triangle 330 is formed between the left corner of the user's right eye, the right corner of the user's left eye and the left corner of the user's mouth. These are but a few examples.

Figure 3D:
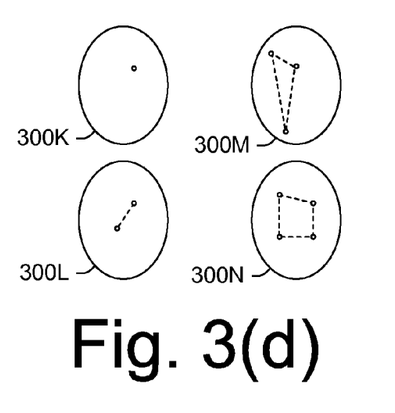

As illustrated in FIG. 3(d), head pose 300K illustrates that a single point may be used, head pose 300L illustrates that two points may be used, head pose 300M illustrates that three points may be used, and head pose 300N illustrates that four points may be used. Thus, one or more points may be used.

Figure 4:
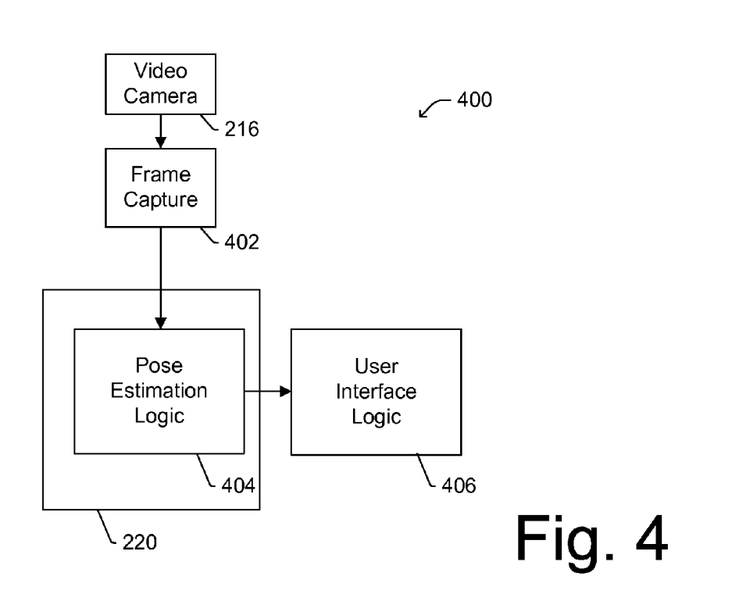
FIG. 4 is another block diagram depicting a system having pose estimation logic that is configured to assess the pose of a person's head, in accordance with certain exemplary implementations of the present invention.

Attention is drawn next to FIG. 4, which further illustrates a system 400 wherein camera 216 includes a video camera that is operatively coupled to logic 220 through a frame capture function 402. Frame capturing techniques are well known. Within logic 220 there is pose estimation logic 404 that receives or otherwise accesses the image data output by frame capture function 402. Here, in this example, pose estimation logic 404 is further operatively coupled to user interface logic 406. Pose estimation logic 404 is configured to assess the pose of the user's head, for example using a plurality of facial points as described above, and to output information to user interface logic 406 that corresponds to the estimated attention area of the user based on the user's current head pose.

Figure 5:
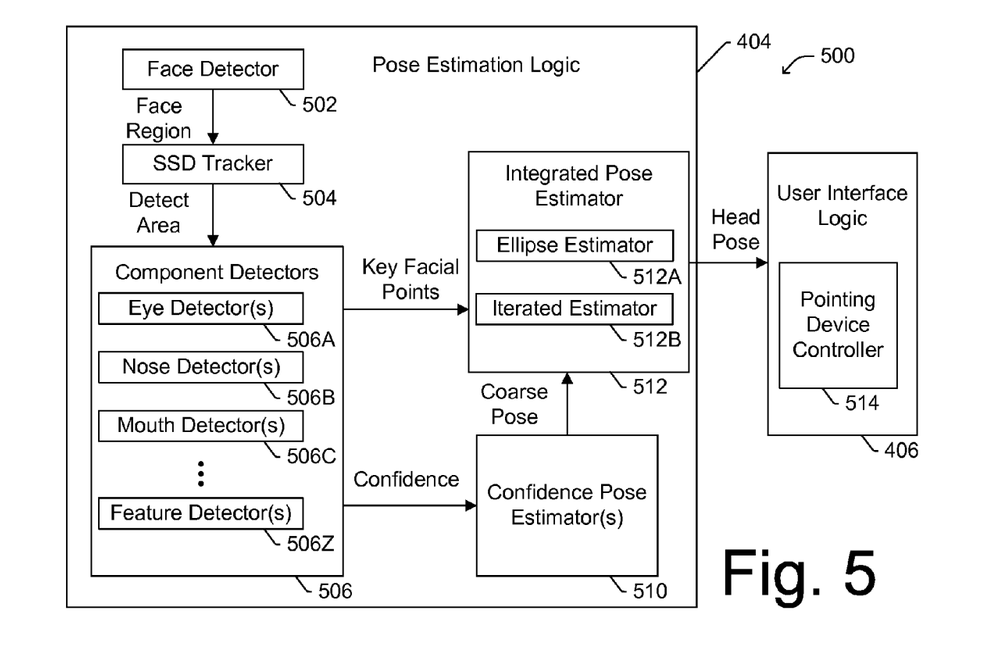
FIG. 5 is a block diagram depicting certain functions within exemplary pose estimation logic and also certain user interface functions/logic, for example, as in FIG. 4, in accordance with certain further implementations of the present invention.

A more detailed exemplary implementation of pose estimation logic 404 is shown in system 500 of FIG. 5. Here, pose estimation logic includes a face detector 502 that identifies a face region within the captured image. The output from face detector 502 is provided to a tracker, such as, e.g., a sum-of-differences (SSD) tracker 504 or the like. SSD Tracker 504 outputs at least one detected area which is then provided to one or more component detectors 506, which detect and output facial points along with some measure of confidence (as applicable). In this example, the confidence information is provided to at least one confidence pose estimator 510 that is configured to produce a coarse pose position by mapping confidence outputs to corresponding coarse information, e.g., through bilinear extraction or some other technique. The coarse pose information is provided along with the detected key facial points to an integrated pose estimator 512, which then outputs estimated head pose information to user interface logic 406. Here, for example, integrated pose estimator 512 includes an ellipse estimator 512A and an iterated estimator 512B, and outputs estimated head pose information that may be used by pointing device controller 514 within user interface logic 406.

Conventional face detection techniques may be implemented in face detector 502 to find regions within the image that may be faces. In certain exemplary implementations, face detector 502 includes a conventional AdaBoost classifier techniques, as described in "Robust Real-time Object Detection", P. Viola and M. Jones, Cambridge Research Laboratory Technical Report Series, February 2001, together with an AdaBoost training technique, as described, for example, in U.S. Patent Application No. 20020102024 A1, published on Aug. 1, 2002.

These and other types of classifiers can be trained, for example, using various face and non-face sample image samples. This may occur during offline machine learning, for example. Face detector 502 is then used to locate the face region in an initialization video frame/image by scanning all the potential face regions and judging whether it is a face. Besides the location and the size of the face, face detector 502 may also output information for a coarse pose estimation of the face, e.g., sometimes referred to as a face channel. When the face channel is frontal, SSD tracker 504 can be initialized, as described below.

In this exemplary implementation, SSD tracker 504 is an image patch tracker based on minimizing the sum-of-square differences between a previously stored image of the tracked patch (e.g., face region) and the current image of it. The image patch (e.g., template image) is updated iteratively to overcome the appearance variance of the face region caused, for example, by pose and illumination. SSD tracker 504 can be configured, for example, to track the nose-mouth region on the user's face in order to provide rough areas where the facial key points may be located. Here, the tracked region size can be carefully selected to balance the reliability, robustness and speed of system 500.

SSD tracking techniques are well known. For example, reference is made to an article published in IEEE CVPR Proceedings, pages 403-410, titled "Real-Time Tracking of Image Regions with Changes in Geometry and Illumination", by G. D. Hager and P. N. Belhumeur.

In accordance with certain further aspects of the present invention, when SSD tracker 504 finds a difference that meets or exceeds at least one programmable or otherwise defined alert threshold (e.g., indicative of a potential tracking error) then it notifies other logic to trigger a new initialization process.

Those skilled in the art will recognize that other tracker techniques may be employed instead of, or in addition to exemplary SSD tracker 504.

Component detectors 506 are in this example a group of detectors configured to locate selected facial key points, such as, e.g., left/right eye centers, nose tip and left/right mouth corners, within a face region. In certain implementations component detectors 506 are similar in design to face detector 502. However, each of the component detectors can be configured to output confidence information about the result location of the facial key points that are subsequently used in confidence pose estimator(s) 508. In the exemplary implementation in FIG. 5, component detectors 506, include eye detector(s) 506A that are configured to detect specific eye related features, nose detector(s) 506B that are configured to detect specific nose related features, and/or mouth detector(s) 506C that are configured to detect specific mouth related features. Other feature detector(s) 506Z may also be provided within component detectors 504, for example, an eye brow detector may be provided.

Confidence pose estimator(s) 510 correlates and determines course pose positioning based on component detection confidence outputs. For example, the confidence outputs of left/right eye centers, nose tip and left/right mouth corners correlate to the user's head pose as illustrated in FIGS. 3(*a-d*). Each confidence output follows specific function. When the user's face is in frontal (e.g., 300A), the confidences of left and right eye corners are basically equal. However, when the user's head turns to the left or the right, then the confidences of the left and right eye corners differ and the difference is determined by a yaw angle. When the user's head tilt up or down, then the confidence of nose is also different to its base value.

Consequently, based on the confidence output sequences of key facial points, the confidence pose estimator(s) can dynamically select certain points for pose estimation. Thus, by comparing confidence outputs of different key facial points in a frame and the same key facial point in different frames, confidence pose estimator 510 produces a coarse estimate of head pose. In certain implementations there is at least one confidence pose estimator for yaw angle and at least one confidence pose estimator for tilt angle. It is recognized that there may be some systems that only need to consider either yaw angle changes or tilt angle changes.

In certain experimental implementations, the accuracy of confidence pose estimator 510 was approximately 15 degrees. As such, in certain systems, this coarse head pose estimation may be accurate enough to pass on directly to user interface logic 406. For example, in a system having three monitors with a different selectable region in each, this course estimate may be adequate to allow automatic switching between them. If there is a need for the estimate head pose to be more precise, then integrated pose estimator 512 is employed. Of course, integrated pose estimator 512 will likely require more computing time/resources than confidence pose estimator 510.

In one exemplary strategy, integrated pose estimator 512 is not employed until the user's head appears to have stayed in one place for a certain period of time (e.g., n number of 2 frames). When employed, integrated pose estimator 512 is run for a period of time and/or until selected component detector 506 have converged.

In still other exemplary implementations, the confidence pose estimator(s) can be combined with integrated pose estimator 512.

Within exemplary integrated pose estimator 512, different methods are combined for more precise pose estimation. Here, for example, ellipse pose estimator 512A can be configured to work with a certain number of key facial points (e.g., three or more) and fit them in an ellipse. According the length ratio of the major axis and minor axis, the dihedral angle between a nominal face plane and nominal camera plane is derived. According to the direction of the minor axis, the normal direction of the face plane can then be determined.

For more information on ellipse pose estimation techniques, the reader is directed to an article titled "Uniqueness of 3D Pose Under Weak Perspective: A Geometrical Proof" by T. Huang et al., as published in 1995 in IEEE Transactions on Pattern Analysis and Machine Intelligence.

Iterated pose estimator 512B is configured in this example to work with several key facial points (e.g., two or more) and iteratively optimizes certain pose parameters, such as, e.g., a yaw angle, a tilt angle, a roll angle, and/or a scale, accordingly with the goal being to minimize the distance between the projection of corresponding key facial points' real configuration and the estimated configuration.

Both the ellipse estimator 512A and iterated estimator 512B can be configured to take key facial point detection errors into account and attempt to stabilize the output head pose. Thus, for example, integrated pose estimator 512 may employ filtering and smoothing technology.

Pointing device controller 514 is basically interface logic that stores/restores the user's work status in all the attention areas, which may be referred to as views. The work status may include, for example, an activated selectable region, a pointer position, an insert cursor, etc. In systems using a significantly large display(s), a view may present certain areas on the screen, whereas in systems having multiple monitors a view may correspond to a single monitor.

When the user changes his/her head pose to focus at another area on the display screen, pose estimation logic 404 notifies pointing device controller 514 about the new pose. Then pointing device controller 514 stores the work status in current attention area and restores the work status of the attentive attention area, e.g., activates the original document, puts the pointer back where it was before and displays the insert cursor if the window has one.

Exemplary pose estimation logic 404 has been designed to be compatible to large display or multiple monitor systems. It also enables the user to customize how many attention areas will be maintained by setting the number of views.

Figure 6:
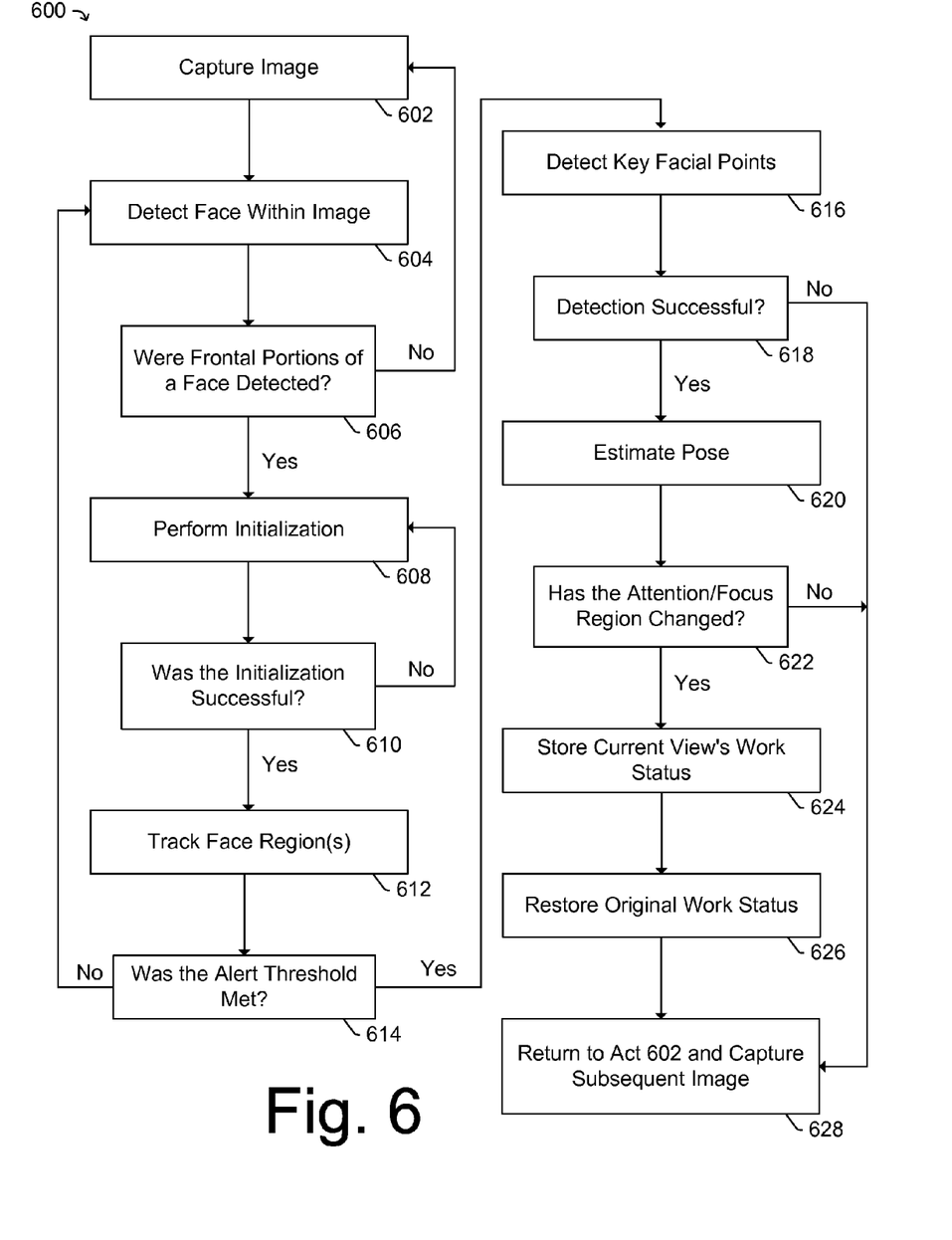
FIG. 6 is a flow diagram depicting a pose estimation process, in accordance with certain exemplary implementations of the present invention.

Attention is now drawn to FIG. 6, which is a flow diagram that shows a method 600 further illustrates and describes the improved techniques provided herein.

In act 602, an image is captured. This may include a single image or multiple images (e.g., for a stereo image system, etc.). The image may be a frame of video data that has been captured. Next in act 604, the image from act 602 is analyzed or otherwise processed to detect face(s) within it. In act 606 it is determined if a frontal portion of at least one face was detected, if so then the method continues with act 608. If, per act 606, no frontal face was detected, then the method returns to act 602 and a new image is captured.

In act 608, an initialization process is conducted wherein, for example, key facial points such as left/right eye center, left/right mouth corner and nose tip are detected by at least two component detectors and the point position configuration and base confidences of the key facial points are stored for future pose estimation. Typically, such component detectors work sufficiently fast enough so that the initialization process occurs in less than one second. In act 610, if the initialization was successfully completed, then the method continues with act 612, if not then the method returns to act 608 and the initialization process is performed again. Although not shown in FIG. 6, if the initialization is unable to be successful after a certain number of repeated/more detailed attempts, then the method may return to act 602.

In act 612, following a successful initialization, selected face regions are tracked, for example, using an SSD tracker or the like. Here, for example, the system can be configured to track the user's head using an iterated SSD tracker in every frame. In certain implementations, for example, the tracked region includes the nose and mouth corners. Other key facial points can be determined according to tracked key facial points. All these component detectors output confidences related to the pose of the user's head.

In act 614, it is determined if the applicable alert threshold(s) were met by the tracked face regions, if so, then the method continues to act 616 and if not then the method returns to act 604.

In act 616 key facial points are detected. Here, for example certain key facial points within the tracked region are detected and refined by the corresponded component detectors, for example, the nose tip and the mouth corners. Other key facial points can be determined according to tracked key facial points and the pose information from a previous frame. All these component detectors output confidences related to the pose of the user's head. Based on a dynamic key facial point selection strategy and the confidence outputs combination, a confidence pose estimator will produce a coarse estimate of the user's head pose. In act 618 it is determined if the detection in act 616 was successful. If so, then the method continues to act 620, otherwise the method continues with act 628.

In act 620 a finer estimate is produced for the user's head pose. Thus, for example, when the user's head stops moving so he/she can focus on some position on the display screen and the key facial points are successfully detected and optimized to a high confidence level, then the key facial point positions are sent to an integrated pose estimator to refine the pose estimation result. The final yaw and tilt angle results, for example, are provided by combining the aforementioned two pose estimators' outputs.

In act 622 it is determined if the user's attention/focus region has changed since last determined. If there has been a change then the method continue to act 624, otherwise the method continues with act 628.

In act 624, the status of the current view's work for the outgoing selectable region is stored. In act 626 the previous or original work status is restored in the incoming selectable region. This completes the automatic focus switch that was predicated on estimating when the user's estimated head pose meant he/she was looking towards a different selectable region.

Act 622, for example, may also incorporate a programmable or otherwise defined delaying mechanism before the focus switch is allowed to occur. One reason for such a delay between the user's motion and the interface reaction is that the delay allows the logic to filter the pose outputs and essentially stabilize them better in certain implementations. Here, for example, the method uses a linear combination of the forgoing frames' pose and current frame's pose output. However, the nearer frames in time will be more important so they may be considered more important or logically weighted differently. This tends to produce a pose output curve that is smoother in spite of detection noise. Another reason for introducing a delay, as mentioned earlier, is that in certain circumstances the user may just turn his/her head quickly to another view and then return back to the previous view. Sometimes, for example, a user may look at another selectable region and continue inputting in currently selected region. To help make the focus switching decision, logic 220 may also be configured to monitor user inputs in the currently active region and decide that the user is ready to switch focus to the new view if no more inputs are made during a period of time.

It is recognized that in certain implementations that the face detector may detect more than one face within the image. As such logic 220 may also be configured to select between the detected faces. For example, in many situations the detected face that is the largest in size will likely be the user of the device since the user is typically closest to the display screen and likely camera arrangement. In certain implementations, facial recognition capabilities may be added to further discriminate between different detected faces.

Those skilled in the art will recognize that if the camera, display device and user are each positioned according to a default system layout, then a system calibration process may not be required. If this is not the case, then there may be a need to calibrate for the layout during system initialization.

As described herein and illustrated in the drawings, in accordance with certain exemplary aspects of the present invention, exemplary pose estimation processes have been shown that are based on face/components detector confidence outputs. The exemplary iterated pose estimator can be based on key points of a object. The system can include coarse to fine pose estimation, for example, wherein a coarse pose is estimated for every frame or so and can be refined when the detected user's face stops moving for a long enough period of time. A exemplary user scenario may include, for example, a system wherein the user works with large scale display, a single display, multiple displays and/or multiple user attention areas. The automatic switching among the attention areas is based on an estimate of user's current pose and corresponding view.

In the exemplary tracking method, an SSD tracker was described. However, there are other conventional tracking methods that may also be employed. With the exemplary SSD tracker, it was found that selecting a region including the user's mouth and nose tip provided adequate results. Clearly, other regions can also be used here provided the system meets applicable accuracy and/or efficiency requirements.

In accordance with certain aspects of the present invention, the number of key points that are used by the pose estimator can vary. For example, certain coarse pose estimators that are based on detection confidence are able to determine a coarse pose of the face based on a single one key point. The resulting coarse head pose includes at least one head pose parameter such as, for example, a yaw angle, a tilt angle, a roll angle, an x translation, a y translation, a scale factor, or the like. The exemplary ellipse pose estimator and iterated pose estimator use at least three key points to generate a fine pose estimation. Typically, the more key points available to such estimators the higher the precision in the resulting estimate.

CONCLUSION

Although the invention has been described in language specific to structural features and/or methodological acts, it is to be understood that the invention defined in the appended claims is not necessarily limited to the specific features or steps described.

What is claimed is:

1. An apparatus for use with at least one display device and at least one image capturing device, the apparatus comprising:
    a processor;
    one or more memories coupled to the processor, the one or more memories having stored instructions that configure the apparatus to implement:
    display logic configurable to output at least one signal suitable for causing a display device to display at least two different selectable regions;
    interface logic configurable to receive image data from an image capturing device;
    pose estimation logic operatively coupled to said display logic and said interface logic and configured to determine a first head pose based on a first image and at least a second head pose based on a second image temporally subsequent to said first image, and automatically operatively switch an operative user input focus between said at least two selectable regions based on at least one difference between said first head pose and at least said second head pose; and
    programmable filter logic operatively coupled to said display logic and said interface logic and configured to filter the second image with respect to the first image, the second image being logically weighted differently than the first image based on an amount of time between a capture of the first image and a capture of the second image.

2. The apparatus as recited in claim 1, wherein said pose estimation logic is further configured to classify each of a plurality of portions of image data associated with said first image based on at least one classifying parameter to determine at least one facial region associated with at least one portion of a face of a user, wherein said face of said user is captured by said first image.

3. An apparatus for use with at least one display device and at least one image capturing device, the apparatus comprising:
    a processor;
    one or more memories coupled to the processor, the one or more memories having stored instructions that configure the apparatus to implement:
    display logic configurable to output at least one signal suitable for causing a display device to display at least two different selectable regions;
    interface logic configurable to receive image data from an image capturing device;
    pose estimation logic operatively coupled to said display logic and said interface logic and configured to determine a first head pose based on a first image and at least a second head pose based on a second image temporally subsequent to said first image, and automatically operatively switch an operative user input focus between said at least two selectable regions based on at least one difference between said first head pose and at least said second head pose; and
    memory operatively coupled to at least said pose estimation logic, said memory being configurable to store said first image and said second image, wherein said first image captures at least a first portion of a face of a user at a first time and said second image captures at least a second portion of said face of said user at a second subsequent time;
    wherein said pose estimation logic is further configured to:
        access said first image, detect at least said first portion of said face within said first image, detect at least one point within said detected first portion of said face, and store first tracking information associated with each of said at least one point within said detected first portion to said memory, and
        access said second image, track at least said second portion of said face within said second image, detect said at least one point within said detected second portion of said face, and store second tracking information associated with each of said at least one point within said detected second portion to said memory, and
        classify each of a plurality of portions of image data associated with said first image based on at least one classifying parameter to determine at least one facial region associated with said first portion of said face.

4. The apparatus as recited in claim 3, wherein said pose estimation logic is further configured to compare at least said first tracking information and said second tracking information to determine if an assessed display device view associated with said user has changed between said first time to said second time, and if said assessed display device view associated with said user has changed between said first time to said second time, then switch said operative user input focus.

5. The apparatus as recited in claim 3, said pose estimation logic is further configured to image patch track said facial region associated with said first portion of said face in a corresponding portion of said second image to identify at least one detected face area.

6. The apparatus as recited in claim 5, wherein said pose estimation logic includes a sum-of-square difference (SSD) image patch tracker to identify said at least one detected face area.

7. The apparatus as recited in claim 5, wherein said image patch tracker compares at least a portion of said resulting detected face area with at least one alert threshold parameter to determine if an associated system initialization process is required.

8. The apparatus as recited in claim 5, wherein said pose estimation logic is configured to detect at least one key facial component within said at least one detected face area to conduct a coarse pose estimation.

9. The apparatus as recited in claim 8, wherein said pose estimation logic is configured to determine a fine head pose of said user based on said detected key facial components.

10. The apparatus as recited in claim 9, wherein said pose estimation logic is configured to determine said fine head pose using by combining the results of at least one estimator technique selected from a group of estimating techniques comprising an ellipse estimator technique and an iterated estimator technique.

11. The apparatus as recited in claim 9, wherein said pose estimation logic is configured to determine said fine head pose using by combining the results of at least one view-based pose estimation technique.

12. The apparatus as recited in claim 8, wherein said pose estimation logic is configured to determine the coarse head pose of said user based on confidence information associated with detecting said at least one key facial component within said at least one detected face area.

13. The apparatus as recited in claim 12, wherein said pose estimation logic is configured to determine a fine head pose of said user based on said detected key facial components and said confidence information.

14. The apparatus as recited in claim 12, wherein said coarse head pose is associated with at least one head pose parameter selected from a group of head pose parameter comprising a yaw angle, a tilt angle, a roll angle, an x translation, a y translation, and a scale factor.

15. A system comprising:
at least one display device;
at least one image capturing device; and
a computing device operatively coupled to said display device and said image capturing device and having:
display logic configured to output at least one signal suitable for causing a display device to display at least two different selectable regions,
interface logic configured to receive image data from an image capturing device, and
pose estimation logic configured to determine a first head pose based on a first image and at least a second head pose based on a second image temporally subsequent to said first image, and automatically operatively switch an operative user input focus between said at least two selectable regions based on at least one difference between said first head pose and at least said second head pose,
wherein said pose estimation logic is further configured to classify each of a plurality of portions of image data associated with said first image based on at least one classifying parameter to determine at least one facial region associated with at least one portion of a face of a user, wherein said face of said user is captured by said first image.

16. The system according to claim 15, further comprising memory operatively coupled to at least said pose estimation logic, said memory being configurable to store said first image and said second, wherein said first image captures at least a first portion of a face of a user at a first time and said second image captures at least a second portion of said face of said user at a second subsequent time.

17. The system according to claim 15, wherein the pose estimation logic is further configured to detect at least one point within said first image and to detect at least one point within said second image.

18. The system according to claim 17, wherein the at least one point within said second image corresponds to the at least one point within said first image.

19. The system according to claim 15, wherein the pose estimation logic is further configured to detect at least two points within said first image and to detect at least two points within said second image.

20. The system according to claim 15, wherein the pose estimation logic is further configured to track information associated with said first image and track information associated said second image, the information tracked from said first and second images used to determine said at least one difference between said first head pose and said second head pose.

\* \* \* \* \*